(12) United States Patent
Kobayashi (10) Patent No.: US 8,427,084 B2
(45) Date of Patent: Apr. 23, 2013

(54) DIGITAL PULSE WIDTH MODULATED MOTOR CONTROL SYSTEM AND METHOD

(76) Inventor: Herbert S. Kobayashi, Webster, TX (US)

( * ) Notice: Subject to any disclaimer, the term of this patent is extended or adjusted under 35 U.S.C. 154(b) by 800 days.

(21) Appl. No.: 12/506,478

(22) Filed: Jul. 21, 2009

(65) Prior Publication Data

US 2011/0018478 A1    Jan. 27, 2011

(51) Int. Cl.
    *H02P 1/00*     (2006.01)
(52) U.S. Cl.
    USPC .......................... 318/257; 318/255; 318/256
(58) Field of Classification Search .................. 318/255, 318/256, 257
See application file for complete search history.

(56) References Cited

U.S. PATENT DOCUMENTS

| | | | |
|---|---|---|---|
| 3,206,665 A | 9/1965 | Burlingham | |
| 3,316,503 A * | 4/1967 | Lenz | 332/112 |
| 3,612,974 A | 10/1971 | Wolf et al. | |
| 3,766,459 A | 10/1973 | McIntosh et al. | |
| 3,858,100 A | 12/1974 | Bussi et al. | |
| 3,898,545 A | 8/1975 | Coppa et al. | |
| 3,942,084 A | 3/1976 | Louth | |
| 4,008,424 A | 2/1977 | Bompani | |
| 4,011,487 A | 3/1977 | Loomis | |
| 4,100,012 A | 7/1978 | Meihofer et al. | |
| 4,145,644 A | 3/1979 | Liu | |
| 4,205,260 A | 5/1980 | Maeda et al. | |
| 4,295,082 A | 10/1981 | Moto et al. | |
| 4,409,529 A | 10/1983 | Basford et al. | |
| 4,550,279 A * | 10/1985 | Klein | 318/696 |
| 4,651,269 A | 3/1987 | Matsumura | |
| 4,693,583 A | 9/1987 | Ogihara et al. | |
| 4,703,244 A | 10/1987 | Takeuchi et al. | |
| 4,710,686 A | 12/1987 | Guzik | |
| 5,334,924 A | 8/1994 | Kawada et al. | |
| 5,637,971 A * | 6/1997 | Pratt | 318/599 |
| 5,729,067 A | 3/1998 | Janutka | |
| 6,018,200 A | 1/2000 | Anderson et al. | |
| 6,051,943 A | 4/2000 | Rabin et al. | |
| 6,058,081 A | 5/2000 | Schell et al. | |
| 6,064,172 A | 5/2000 | Kuznetsov | |
| 6,069,857 A | 5/2000 | Schell et al. | |
| 2006/0291820 A1 | 12/2006 | Kobayashi | |
| 2008/0185987 A1* | 8/2008 | Kawakami et al. | 318/811 |
| 2008/0219649 A1 | 9/2008 | Hirata | |
| 2011/0079213 A1* | 4/2011 | Lam | 126/573 |
| 2011/0226078 A1* | 9/2011 | Kobayashi et al. | 74/471 R |

* cited by examiner

*Primary Examiner* — Kawing Chan
(74) *Attorney, Agent, or Firm* — Kenneth L. Nash (57) ABSTRACT

A digital motor control system utilizes at least two variable pulse generators to produce two streams of pulse width modulated pulses to control the motor speed and direction of rotation of a motor. An input control signal may be compared with two reference signals, such as two waveforms which are inverted with respect to each other, to produce two streams of pulse width modulated signals. A logic circuit combines the two streams of pulses.

17 Claims, 7 Drawing Sheets

DIGITAL PULSE WIDTH MODULATED MOTOR CONTROL SYSTEM AND METHOD

BACKGROUND OF THE INVENTION

1. Field of the Invention

The present invention relates generally to motor control systems and, more particularly, to a multiple pulse width modulation digital motor control system to control both the motor speed and direction of rotation for D.C. or A.C. electric motors.

2. Description of the Background

Prior art motor control systems generally operate with significant inefficiencies such as high heat dissipation, and/or have problems related to changing the motor rotation direction. The circuitry shown in my previous U.S. Pat. No. 7,421,193, which is incorporated in its entirety herein by reference, discloses a motor control with very low heat dissipation, which in one embodiment provides a controller for speed and motor direction. However, a disadvantage of the circuitry taught in my previous patent is that the maximum forward and reverse pulse had only a 50% duty cycle.

For a servo power control system to operate reliably without failure, the system design should always consider the power dissipation and the flexibility of the design in allowing its application to large and small motors. This may be especially important in applications where the available power may be limited.

Open loop motor speed control systems have used variations of the time durations of pulses applied to the motor due to their efficient use of power, which especially useful for battery operated devices. An example is in application to a variable speed drill, screwdriver, or socket driver wherein a mechanical switch is used to control motor direction. The inconvenience in having to mechanically change motor direction has been accepted as a necessity, although it would be desirable for some workers who have only one hand for operation to be able to change motor direction without manually operating a switch.

The following patents represent background art in motor controls of various types and show prior art attempts to solve the above and/or related problems as discussed above:

U.S. Pat. No. 3,206,665, issued Sep. 14, 1965, to C. Burlingham, discloses a digital motor control servo system having a source of command pulses indicative of a desired motor speed, a source of feedback pulses indicative of actual motor speed, a reversible binary counter connected to those sources so as to accumulate the difference between the total number of pulses delivered by each source, control means for varying the motor speed in accordance with the accumulated count, and inhibition means connected between the sources and the counter to the output of the counter to prevent pulses from reaching the counter whenever the pulses would oversaturate the counter.

U.S. Pat. No. 3,612,974, issued Oct. 12, 1971, to Wolf et al., discloses a motor that generates first pulses having a frequency related to the speed of rotation of the motor, second pulses generated in response to the first pulses having durations at least greater than a minimum time duration, and third pulses generated and used to pulse drive the motor having durations related to the time differences between the terminations of the second pulses and the initiations of the first pulses.

U.S. Pat. No. 3,766,459, issued Oct. 16, 1973, to McIntosh et al., discloses a control system for a machine tool having a direct current motor capable of rotating the motor shaft in a series of discrete steps through a range and maintaining the shaft in position between the steps. The motor is controlled by a digital to analog converter which receives an input having a bi-directional digital counter. A pulse generator inputs a preselected number of pulses in a preselected direction. An encoder responsive to the angular position of the motor shaft produces a fixed number of pulses for a given rotation, and the pulses count the counter in a direction related to the direction of movement of the motor shaft. Circuitry is provided both to match a directional signal with each pulse to control the counter direction and also for buffering all of the pulses to prevent more than one pulse from reaching the bi-directional digital counter at substantially the same time.

U.S. Pat. No. 3,858,100, issued Dec. 31, 1974, to Bussi et al., discloses a digital phase control adjustment system for a D.C. motor which finds particular utility in applications where fast start and stop operations of the motor are required. The pulses forming a reference signal and those forming a variable signal are stored sequentially in a shift register and when the shift register is alternately storing ones and zeros, the pulses of the two signals are in alternate sequence for a certain number of periods, indicating that the motor speed is near the intended value.

U.S. Pat. No. 3,898,545, issued Aug. 5, 1975, to Coppa et al., discloses a motor control circuit for maintaining a d-c electric motor at a constant speed, including a speed sensing means connected to the d-c electric motor to generate motor pulses whose duration is inversely proportional to the speed of the d-c electric motor, a bistable means for providing a continuous drive signal to the d-c electric motor and responsive to the application of the motor pulses and to the application of reference pulses generated by the motor pulses. The bistable means drives the d-c electric motor as long as the fixed duration of the reference pulses is shorter than the duration of the motor pulses being generated due to the rotation of the armature of the electric motor. Delay means are provided in the circuit to prevent ambiguity at the bistable means due to the simultaneous application of both the motor pulses and reference pulses to the bistable means.

U.S. Pat. No. 3,942,084, issued Mar. 2, 1976, to Louth, discloses a motor drive and servo systems particularly useful in high quality broadcast video tape recorders. A sine/cosine drive for a brushless DC motor permits high motor efficiency in a system adapted for use in a servo loop. A technique for phase locking a pair of frequency related phase locked control variable signals to a pair of frequency related reference signals, horizontal and vertical sync signals, for example, provides the advantages and precision of closed loop correction at widely variable correction rates. More accurate tape shuttling in a VTR is provided by running a DC motor in a phase locked loop as a synchronous motor and more accurate stopping of the tape is provided by comparing the capstan speed to ground in a closed loop. Improved tape tension control in the head area is provided by a pair of vacuum columns controlled by an error signal derived from the peak-to-peak tension error.

U.S. Pat. No. 4,008,424, issued Feb. 15, 1977, to G. Bompani, discloses an error voltage signal which is of magnitude related to the difference between the actual speed of a D.C. motor and a desired speed that is selectively applied to either the inverting input terminal of an operational amplifier or to its non-inverting input terminal, dependent upon the direction of rotation of the motor. The circuit components connecting the error signal to the input terminals are selected to provide the same absolute value of gain for the amplifier regardless of whether the input is to the inverting terminal or to the non-inverting terminal. The system substantially reduces complexity and diminishes the number of components required for this type of bidirectional speed regulation.

U.S. Pat. No. 4,100,012, issued Jul. 11, 1978, to Meihofer et al., discloses a web splicing apparatus that employs a pair of driven nip rolls which controllably feed web from a running roll into a festoon as web is drawn out of the festoon at a constant rate by a downstream web consuming machine. The nip rolls are driven by a DC motor connected in a closed loop servo system which compares the speed of the web entering the festoon with the web line speed to develop a command signal for the motor. During normal operation, the command signal includes a web velocity trim signal developed by monitoring the position of the festoon dancer relative to a selected reference position so as to minimize tension upsets and to maintain the dancer within its control range. During a splice sequence, the command signal comprises a deceleration ramp having a selected slope to provide controlled deceleration of the web to minimize tension upsets and to permit actuation of the splicing nips prior to actual web stop. After the splice is made, the command signal comprises an acceleration ramp whose slope is automatically adjusted to apply the least necessary tension to the ready web for new roll acceleration consistent with a given splicing speed. Further with this arrangement, the gain of the system is independent of the changing size of the expiring roll.

U.S. Pat. No. 4,100,012, issued Jul. 11, 1978, to Meihofer et al, discloses a web splicing apparatus that employs a pair of driven nip rolls which controllably feed web from a running roll into a festoon as web is drawn out of the festoon at a constant rate by a downstream web consuming machine. The nip rolls are driven by a DC motor connected in a closed loop servo system which compares the speed of the web entering the festoon with the web line speed to develop a command signal for the motor. During normal operation, the command signal includes a web velocity trim signal developed by monitoring the position of the festoon dancer relative to a selected reference position so as to minimize tension upsets and to maintain the dancer within its control range. During a splice sequence, the command signal comprises a deceleration ramp having a selected slope to provide controlled deceleration of the web to minimize tension upsets and to permit actuation of the splicing nips prior to actual web stop. After the splice is made, the command signal comprises an acceleration ramp whose slope is automatically adjusted to apply the least necessary tension to the ready web for new roll acceleration consistent with a given splicing speed. Further with this arrangement, the gain of the system is independent of the changing size of the expiring roll.

U.S. Pat. No. 4,145,644, issued Mar. 20, 1979, to R. Liu, discloses a stepping motor control circuit permitting selective operation of the motor in various modes such as half or full step mode. The circuit includes a pulse generator producing pulses at a selected motor step rate. A switch means selects the step size while a second switch selects the motor direction. An up/down counter counts pulses from the pulse generator in a direction correlated with the selected rotation direction. A read-only-memory is addressed as a function of the periodically repeating count in the up/down counter and the selected step size. The stored information at the addressed read-only-memory location actuates motor drive circuitry which generates energizing signals for the motor windings to drive the motor in the selected direction a distance corresponding to the selected step size at a step rate equal to the pulse rate of the pulse generator.

U.S. Pat. No. 4,205,260, issued May 27, 1980, to Maeda et al., discloses a motor control system including a clock pulse generator. Use is made of the clock pulses for deriving digitally, the speed-above-normal signal, the starting signal, the brake-release signal and the normal or forward rotation signal for displaying the normal or forward rotation. In response to the starting signal, 100% torque control voltage is generated and in case of the forced reversal in rotation, 100% torque control voltage for preventing the rotation in the reverse direction is generated.

U.S. Pat. No. 4,295,082, issued Oct. 13, 1981, to Moto et al., discloses a motor servo circuit. The motor in the motor servo circuit is driven by an output which is obtained by logically adding output pulses of a pulse stretcher circuit which stretches a pulse width of error pulses generated from an OR circuit when pulses inputted to the motor servo circuit and pulses outputted from a pulse generator in response to the input pulses are different in the pulse width to pulses having a predetermined pulse width which are generated at intervals of a predetermined member of the error pulses synchronizing therewith.

U.S. Pat. No. 4,409,529, issued Oct. 11, 1983, to Basford et al., discloses a prosthesis comprising: (a) a gripping member; (b) an operating lever mounted to pivot about a pivot axis and operatively connected to the gripping member; (c) a power unit including an electric motor, and a drive shaft rotatable by the electric motor; (d) means connecting the drive shaft to the operating lever at a region spaced from the pivot axis of the operating lever, the connecting means being constructed so that when the drive shaft rotates the connecting means (and also the region of the operating lever connected to the shaft) travels axially along the shaft thereby causing the operating lever to pivot about its pivot axis; and (e) means pivotally mounting the power unit to allow the connecting means to move along an arcuate path about the pivot axis during pivoting of the operating lever.

U.S. Pat. No. 4,651,269, issued Mar. 17, 1987, to K. Matsumura, discloses a circuit for reversing an electric current flow comprising a motor, a circuit formed of a first transistor at a power source side and a third transistor at the ground side which are connected in series, a circuit formed of a second transistor at the power source side and a fourth transistor at the ground side which are connected in series, the junction of the first and third transistors being connected to one terminal of the motor and the junction of the second and fourth transistors being connected to the other terminal of the motor, and a pulse generator for producing an output signal which delays the turn-on timing of the third or fourth transistor until the state of the first or second transistor has been changed from an on-state to an off-state.

U.S. Pat. No. 4,693,583, issued Sep. 15, 1987, to Ogihara et al., discloses a programmable shutter of the type wherein a shutter blade is opened and closed by means of a stepping motor. The motor is rotated in a forward direction by drive pulses of a predetermined fixed period to gradually open a sector while at the same time a light measuring circuit is started. Thus, at the time when an appropriate exposure quantity is reached, the direction of rotation of the motor is forcibly reversed to effect closing of the sector to attain simultaneous measurement of light and exposure.

U.S. Pat. No. 4,703,244, issued Oct. 27, 1987, to Takeuchi et al., discloses a frequency divided pulse produced by frequency dividing a clock signal by speed instruction data. When the current position of the pulse motor has not yet reached a set desired position, a frequency divided pulse is outputted as a forward rotation control pulse. When the current position has exceeded said set position, a frequency divided pulse is outputted as a reverse rotation control pulse. If the set desired position is changed while the pulse motor is rotating, this change of setting is detected and the output of the frequency divided pulse is inhibited for a predetermined settling period of time, thereby stopping the pulse motor.

After the vibration of the rotor which occurs during the stepping of the pulse motor is settled, the reverse rotation of the pulse motor can be started, thereby preventing the occurrence of the step-out phenomenon of the pulse motor upon reverse rotation.

U.S. Pat. No. 5,334,924, issued Aug. 2, 1994, to Kawada et al, discloses that speed control of an induction motor is effected in digital fashion through use of a computer but without complex processing, and with a computer that need not be large in scale. This is accomplished by processing at least a speed command signal, actual speed signal and torque signal in analog fashion, enabling simplification of an induction motor speed control digital processing section which performs all other control operations in a digital manner. In a speed control network having a closed loop, a frequency-to-voltage converter, adder-subtractor, proportional integrator, polarity determining circuit absolute value circuit and voltage-to-frequency converter are constructed of circuitry operable on the basis of analog values, with all other circuits being constructed of circuitry operable on the basis of digital values.

U.S. Pat. No. 5,729,067, issued Mar. 17, 1998, to Janutka, discloses an improved method and servo control apparatus for controlling the motion of a linear electric motor which in turn generates motion command signals to various apparatus such as a hydraulic steering system. Preferably, the servo control apparatus includes a power supply circuit, a servo amplifier circuit, a pulse width modulation circuit, an H-bridge drive circuit and an inductive position sense circuit. The voltage at a node between coil pairs in the motor is sensed and synchronously demodulated using transmission gates to develop a DC signal representative of armature position from a center location. The signal on a current shunt resistor is synchronously demodulated by transmission gates to generate a signal, the phase of which is determined with respect to the motor drive signal. The phase signal directly indicates whether the armature is off center towards drive coil or drive coil.

U.S. Pat. No. 6,018,200, issued Jan. 25, 2000, to Anderson et al, discloses the throttle of an engine in an engine driven generator system operating subject to a wide and rapidly variable load, as in supplying current to a welder, is operated such that control signals are sent to a throttle actuator for adjusting the engine throttle position in response to load changes. The throttle actuator may be a solenoid pulling against a spring in accordance with the average current through the solenoid coil. In this embodiment, the processor causes pulse width modulated signals to be applied across the solenoid coil with throttle position changes being reflected in changes to the width of the pulses, such changes in the pulse width being delayed for at least the predetermined time since the last preceding adjustment to the throttle. Alternatively, the throttle actuator may be a stepper motor which is stepped by throttle position change signals from a processor which monitors engine speed and generator load to determine whether the throttle should be adjusted and, if so, in which direction and to what extent for optimum response.

U.S. Pat. No. 6,051,943, issued Apr. 18, 2000, to Rabin et al, discloses a motor control system employing a single Hall sensor providing a position feedback signal to a control circuit. The control circuit includes a tach counter circuit, a ramp mode circuit, an interpolation circuit, and a commutation logic circuit. Drive signals are output to the motor windings by the commutation logic circuit. The control state defining the drive signals is advanced on the basis of the estimated rotor position. The estimate of the rotor position is determined by linearly interpolating between Hall signal transitions.

U.S. Pat. No. 6,058,081, issued May 2, 2000, to Schell et al, discloses an optical drive system that includes an objective lens subassembly for directing light from a light source toward an information storage medium. An amount of the directed lighted light is returned from the storage medium. An objective lens is disposed in the objective lens subassembly. A first servomotor moves, during focus capture, the objective lens to a first position, away from the first position toward the storage medium being read while looking for a maximum Quad Sum signal, and back away from the storage medium. An electronic control circuit is connected to the first servomotor. A servo error detector is coupled to the electronic control circuit and disposed in a path of light returning from the information storage medium. The servo error detector is implemented to determine when total light returned from the information storage medium exceeds a-predetermined value, to search for a first zero crossing, corresponding to when the Quad Sum signal exceeds a predetermined amplitude, and to indicate to the electronic control circuit to direct close of focus when the Quad Sum signal exceeds the predetermined amplitude.

U.S. Pat. No. 6,064,172, issued May 16, 2000, to Kuznetsov, discloses a winding fault detection system that provides classification and identification of winding faults or winding malfunctions. The fault detection system provides signals to individual electronic switches for segmented primary windings each having an electrical phase and grouped into sub-phases which are individually switch into or out of an excitation supply or isolated through the electronic switching in response to signals from the winding fault detection system. Each primary winding forms an electrical member which includes a stator having a poly-phase winding, and there is a secondary electrical member magnetically coupled with the stator. Each primary has magnetic field sensors which detect phase angle and magnitudes of radial components of air gap flux by magnetic measurement probes between each secondary electrical member and each primary electrical member and derives an electrical signal for a component of air gap flux contributing to electromagnetic torque at each position of each stator's periphery. Additionally, the system instantaneously stores data continuously derived from the magnetic sensors and determines a hierarchy of fault detection schemes.

U.S. Pat. No. 6,069,857, issued May 30, 2000, to Schell et al, discloses an optical disc drive system that is employed in conjunction with a storage medium having a plurality of data sectors each provided with a header and a data storage area. The system includes a data detection device for retrieving stored data from the storage medium and outputting a data signal, an amplifier for providing a variable gain to the data signal and outputting an amplified data signal, a detector that is responsive to the amplified data signal for evaluating a predetermined one of the sectors to ascertain whether the storage area is blank, and an automatic gain control circuit producing a gain control output for controlling the gain of the amplifier. The control circuit has a first mode and a second mode, the first mode being active during retrieval of the header and the second mode being active during retrieval of the data storage area. The system is further provided with a sampling device for sampling the gain control output during retrieval of the stored data in a respective one of the storage areas containing previously stored data. The sampling device outputs results of the sampling, and a fixed gain control circuit is responsive to the results of the sampling for outputting a fixed gain control signal. The fixed gain control signal is applied to the amplifier during evaluation of the predetermined one of the sectors.

It would be desirable to provide a low power dissipation control system without the disadvantages of the systems discussed above. Consequently, there remains a long felt need for an improved motor speed and direction control system. Those skilled in the art have long sought and will appreciate the present invention which addresses these and other problems.

SUMMARY OF THE INVENTION

It is an object of the present invention to provide an improved motor control.

It is another object of the present invention to provide a stable, energy efficient, servo control system.

These and other objects, features, and advantages of the present invention will become apparent from the drawings, the descriptions given herein, and the appended claims. However, it will be understood that above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a control system operable for controlling a direction and speed of an electric motor. The control system which may comprise one or more elements such as, for instance, a clock pulse generator and/or waveform generator to produce clock pulses and/or waveforms, and a plurality of variable duration pulse generators to produce output pulses, which may be synchronized with the clock pulses and/or waveforms. Otherwise, the pulses may be produced at staggered intervals with respect to each other by some suitable means. Other elements may comprise a pulse duration control for controlling the at least two variable width pulse generators to thereby vary a duration of the output pulses. A logic control which may utilize digital circuitry is operable for producing control signals which control forward and reverse rotational direction and speed of the motor in response to the output pulses from the pulse generator. A power switch network may be utilized for interfacing the forward motor rotation output and the reverse motor rotation output to the electric motor.

The control system may comprise an open loop control system or a closed loop control system. When utilized in a closed loop control system, the system may further comprise a shaft rotatable by the motor and variable output element responsive to a rotational position of the shaft. The variable output element provides feedback to the pulse duration control to control the rotational position of the shaft.

In one embodiment, the pulse duration control can comprise a spring-loaded joystick such that movement in one direction varies motor speed in a forward direction and movement of the joystick in the opposite direction controls motor speed in the opposite direction. The motor may be a D.C. motor or an A.C. motor.

In operation, a method is provided for controlling direction and speed of an electric motor. The method may comprise one or more steps such as, for instance, controlling a duration of a plurality of output pulses, and/or producing control signals to control the direction and speed based.

The method may further comprise producing a first direction control signal for rotation of the motor in a first rotational direction when the combined width of the output pulses has a shorter duration than a cycle of a waveform. The method may further comprise producing a second direction control signal for rotation of the motor in a second rotational direction opposite to the first rotational direction when the combined width of the output pulses has a longer duration than a cycle of the waveform.

The method may further comprise providing that the motor does not rotate when the cycle of the waveform is equal or substantially equal to the combined duration of the output pulses. The method may further comprise providing that a magnitude of difference between the cycle or duration of the waveform and the combined duration of the output pulses controls the motor speed. The method may further comprise applying the control signals to solid state or mechanical relays for controlling at least one of a D.C. electric motor or an A.C. electric motor.

In another possible embodiment, a control system may comprise a variable control element, and a logic control circuit operable for producing control signals which control forward and reverse rotational direction and speed of the motor, the logic control being responsive to the variable control element. Other elements may comprise an electric power supply to supply electric power to the electric motor, and a plurality of power switches changeable between a first configuration and a second configuration as controlled by the logic control circuit. The first configuration connects a first set of power switches to the windings so the electric motor rotates in a forward direction. The second configuration connects a second set of power switches to the windings so that the electric motor rotates in a reverse direction. Accordingly, the electric motor is responsive to changes in the variable control element to control direction of the electric motor.

The logic system is operable for controlling a rotational speed of the electric motor in the forward direction or the reverse direction by controlling the time duration for which the plurality of power switches apply power to the motor windings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides linear motor control using pulse width modulation. In one embodiment, two streams of pulse width modulated pulses are produced. The streams of pulses are staggered in that they begin at different times. Due to the logic circuit which combines the two streams of pulses, as the pulse widths change from small to large, the motor rotates at a high speed in one direction, slows down, stops, and then increases speed in the opposite direction. Different types of pulse generators may be utilized in accord with the present invention. Different types of triggers for the pulse generators may be utilized. The system provides low power loss, low cost, low weight, and increased efficiency of the motor speed control system.

Figure 1:
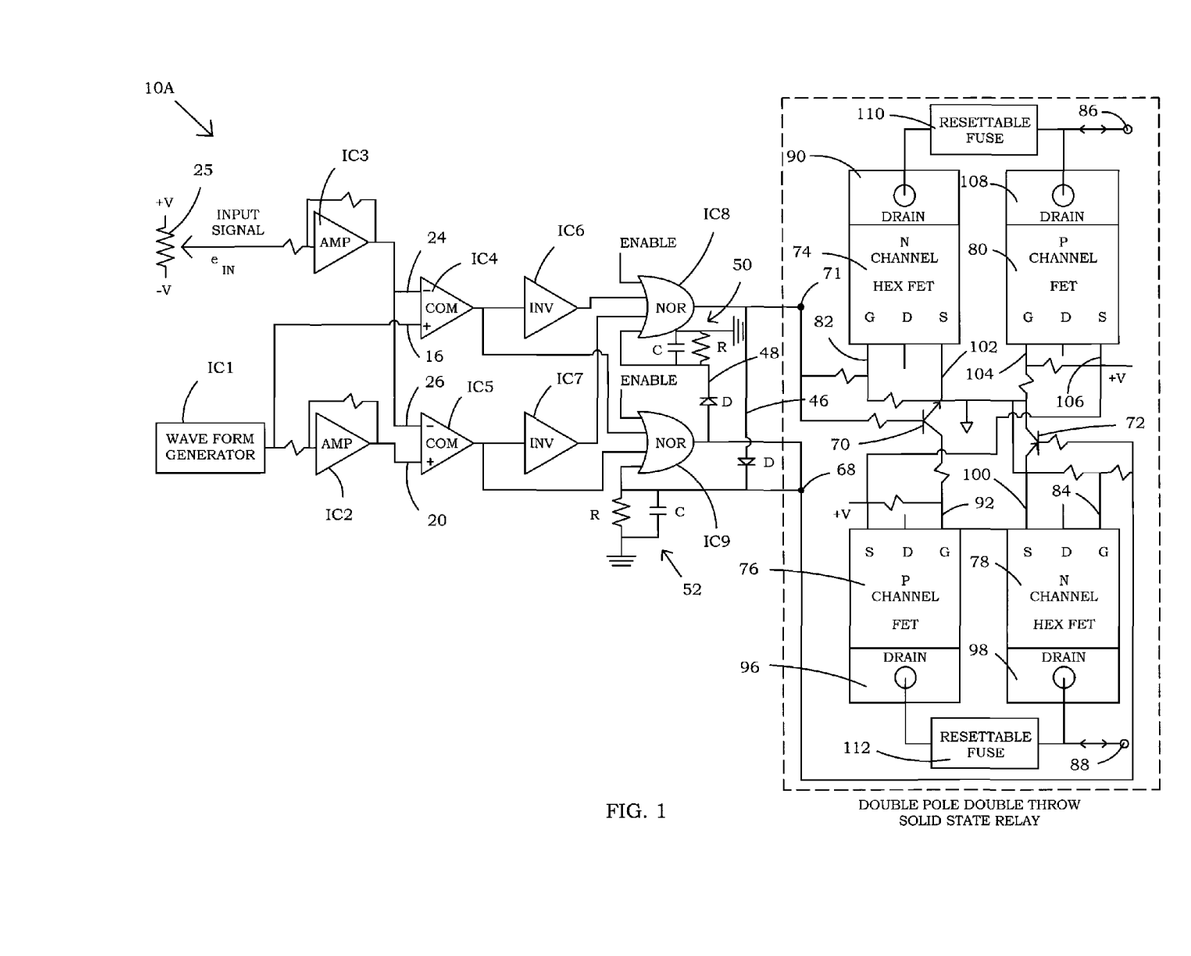
FIG. 1 is a schematic diagram of a motor control operable for controlling motor speed and direction with two variable width pulse generators in accord with one possible embodiment of the present invention.
Figure 4:
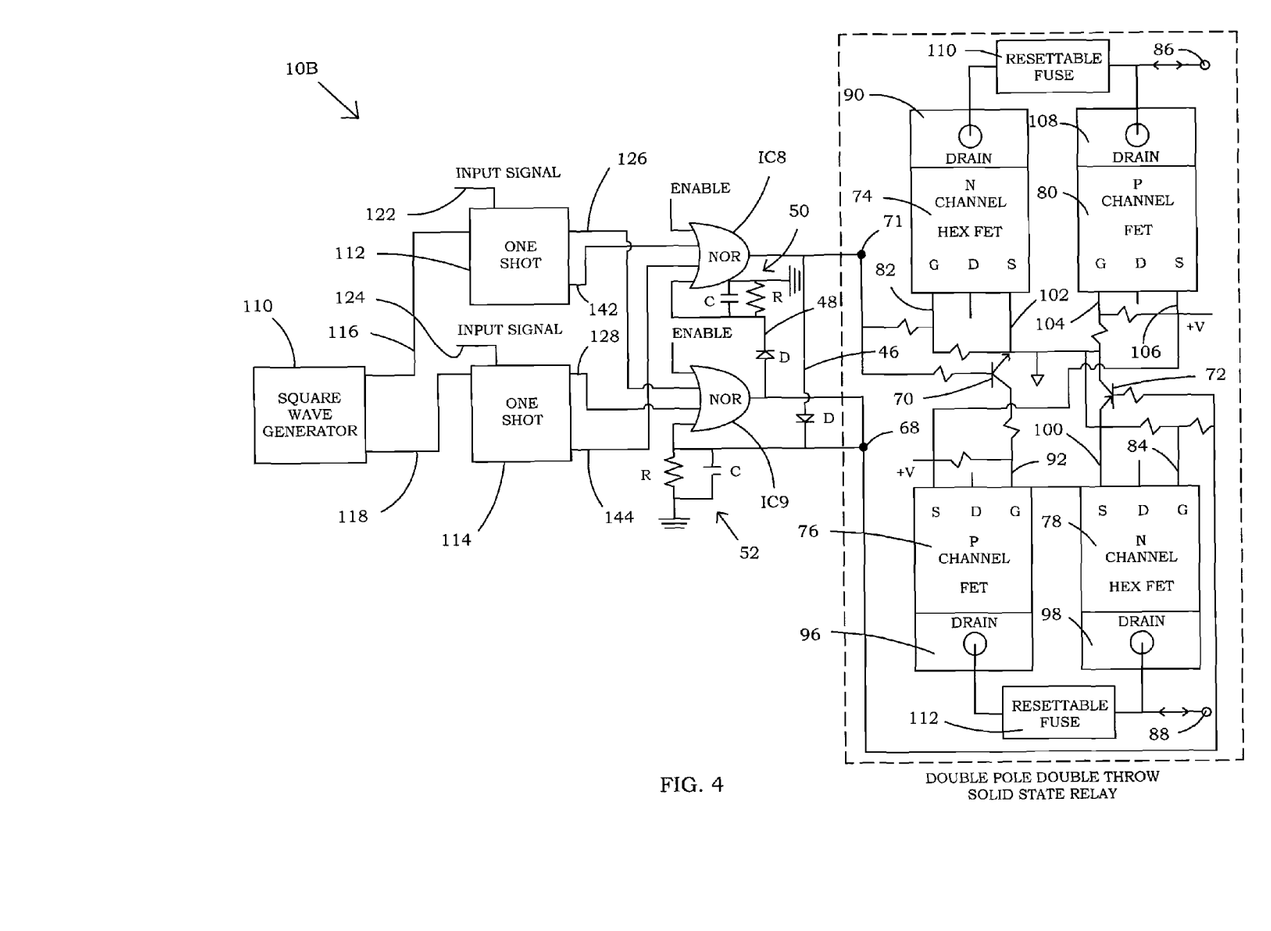
FIG. 4 is a schematic diagram of a motor control operable for controlling motor speed and direction with at least two variable width pulse generators in accord with another possible embodiment of the present invention.

Referring now to the drawings and more particularly to FIG. 1 and FIG. 4, there are shown circuit diagrams for motor control 10A and 10B which utilize two different types of variable width pulse generators, but which may use similar types of logic controls and drivers for the motor. While only the open loop circuit is shown in FIGS. 1 and 4, the closed loop circuit is the same with the addition of a feedback control element as discussed in my previous patent. A suitably programmed processor may also be utilized as a closed loop control element by sampling the output and producing an appropriate input to control circuit 10A and 10B. Thus, the present discussion will center on the open loop circuit with some discussion of equations relevant to the closed loop design but with the understanding that motor control 10A and 10B may be utilized in closed loop as well as open loop designs.

In FIG. 1, motor control 10A utilizes waveform generator IC 1 to produce repetitive waveforms. In one example of motor control 10A, triangular waveform 12 is generated, shown in FIG. 2. In another embodiment example of motor control 10A, a sinusoidal waveform 14 is generated, such as shown in FIG. 3. Thus, motor control 10A is not limited to use of a particular type of waveform. However, in one possible embodiment the waveform is preferably symmetrical and repetitive. The waveform generator may utilize a clock signal, such as the clock signal shown in FIGS. 2 and 3.

Figure 2:
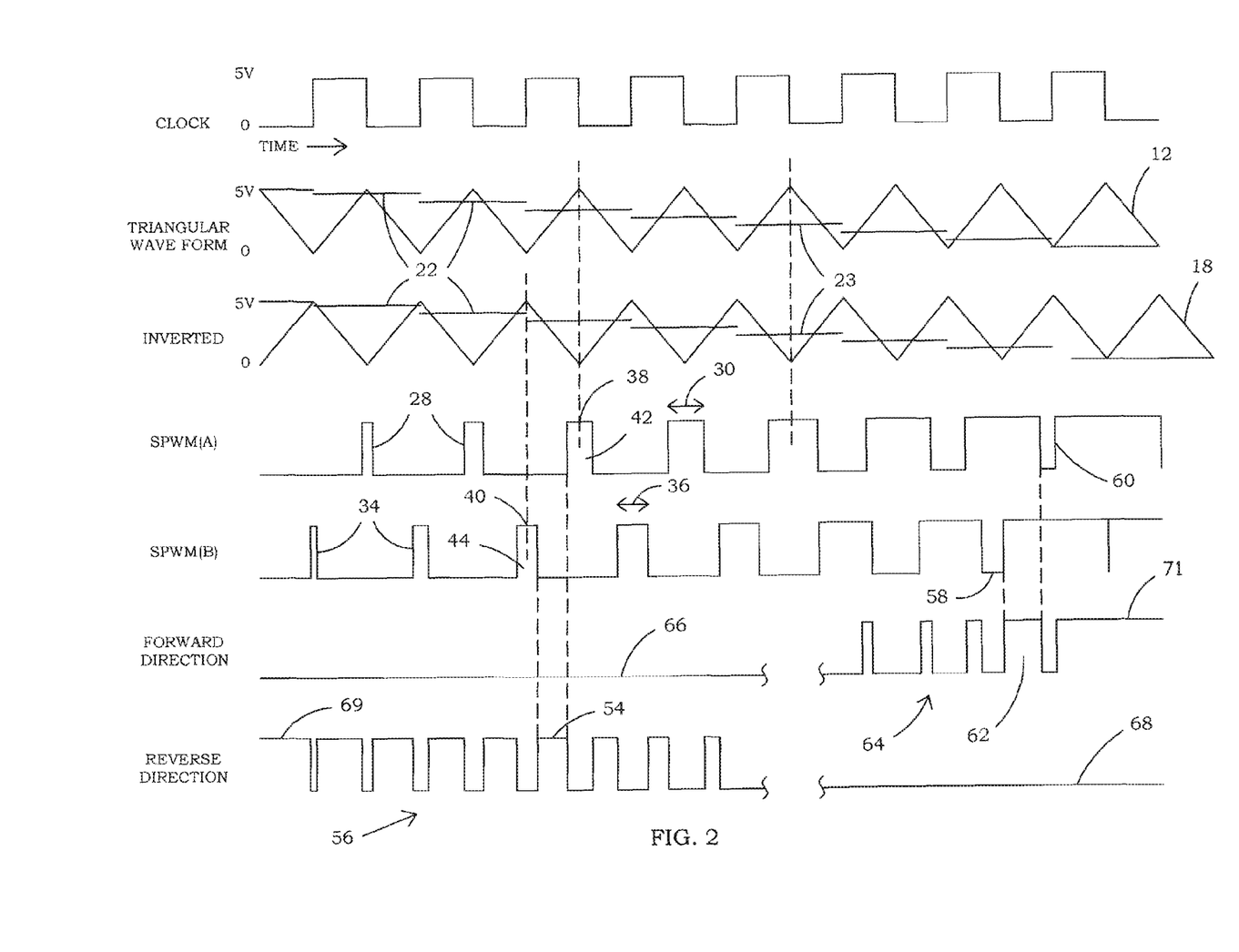
FIG. 2 is a signal diagram of for the motor control of FIG. 1 when used with a triangular waveform generator in accord with one possible embodiment of the present invention.
Figure 3:
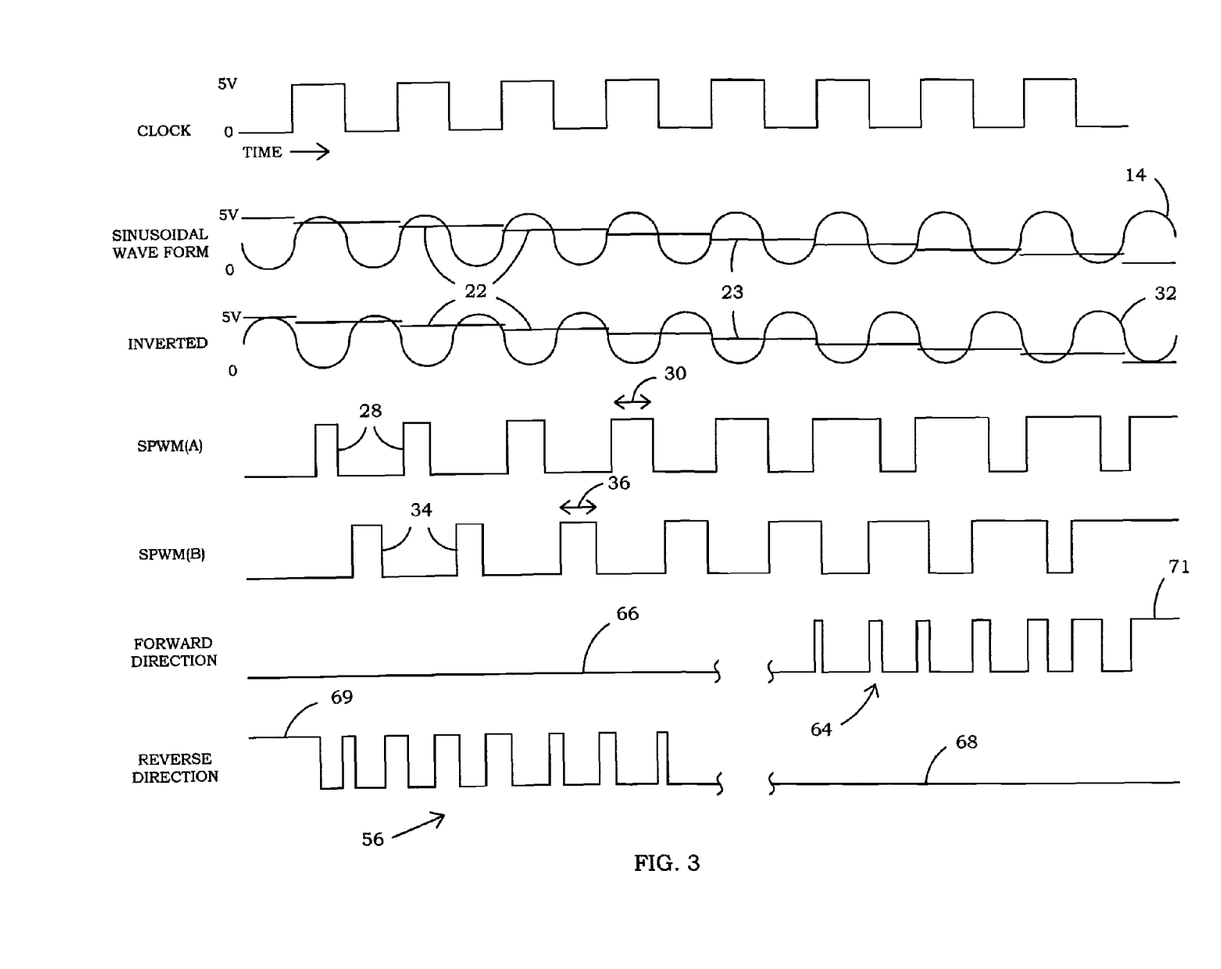
FIG. 3 is a signal diagram of for the motor control of FIG. 1 when used with a sinusoidal waveform generator in accord with one possible embodiment of the present invention.

The output of IC 1, see triangular waveform 12 in FIG. 2 or sinusoidal waveform 14 in FIG. 3, is applied to input 16 of comparator IC4 and inverter IC2. The output of inverter IC2, see inverted triangular waveform 18 in FIG. 2 or inverted sinusoidal waveform 32 in FIG. 3, is applied to input 20 of comparator IC 5.

Control signal 22 is utilized to control the motor speed and direction. In this embodiment, control signal 22 is a variable voltage level as shown in FIG. 2 and FIG. 3. While in this case, the input signal, which may be referred to as $e_{in}$, is produced by voltage divider or potentiometer 25, which is connected to plus and minus voltage sources at opposite ends, other means for control might include a suitably programmed processor which produces programmed voltage levels in response to programming, user input, feedback, and the like.

In this example, when control signal 22 varies continuously with respect to triangular waveform 12 from +5 volts to the middle of the voltage range as indicated at 23, then the AC or DC motor slows continuously from a high speed to zero RPM. As control signal 22 varies with respect to triangular waveform 12 towards the zero volt level from middle level 23, the motor is initially at zero RPM and is then driven in a first direction, which may be a forward direction, at increasingly higher speed. As control signal 22 varies with respect to triangular waveform 12 from the middle of the voltage range 23 towards +5 volts, the motor is driven in the opposite direction, such as a reverse direction, at increasing higher speed.

At the maximum voltage levels with respect to the reference waveform, in this example at +5 and 0 volts, the motor is driven continuously on in the reverse direction or the forward direction, respectively. At the middle of the voltage range, the motor speed is zero RPM. It will be appreciated that the relative voltage levels may change and that use of both plus and minus voltage supplies are not necessarily required.

If desired, input control signal 22 may be applied to gain and stability IC3 which may adjust the open or closed loop servo gain relative to the output of IC1 and perhaps also provide stability to the servo loop. Other types of circuitry could also be utilized for controlling the relative gain and stability in IC1 and the input signal 22 of the servo loop.

The output of IC3, referred to as control signal 22 is applied to comparators IC4 and IC5, at respective inputs 24 and 26. A reference signal, such as a waveform, is applied to inputs 16 and 20 of IC4 and IC5. In this example, control signal 22 is compared with triangular waveform 12 or sinusoidal waveform 14 in comparator IC4 and is also compared to inverted triangular waveform 18 or inverted sinusoidal waveform 32 in comparator IC5.

The output of IC4 or IC5, which is labeled SPWM(A) or SPWM(B), respectively, in FIG. 2 and FIG. 3, is a positive output when input control signal 22 is greater than the reference. Likewise, the output of IC4 and IC5 is zero when the input control signal is less than the reference signal.

Accordingly, when triangular waveform 12 or sinusoidal waveform 14 is greater than control signal 22, then the output of IC4, which is labeled SPWM (A) in FIG. 2 and FIG. 3, is positive. Due to the repeating nature of the waveform, first series of pulses 28 is produced, as shown in FIGS. 2 and 3. As control signal 22 decreases, the duration or pulse width 30 of pulses 28 increases. This is because the time which triangular waveform 12 or sinusoidal waveform 14 is greater than control signal 22 increases as control signal 22 decreases.

Likewise, when inverted triangular waveform 18 or inverted sinusoidal waveform 32 is greater than control signal 22, then the output of IC5, which is labeled SPWM (B) in FIG. 2 and FIG. 3, is positive. Due to the repeating nature of inverted triangular waveform 18 or inverted sinusoidal waveform 32, second series of pulses 34 is produced. It will be appreciated that as control signal 22 decreases, that the duration or pulse width 36 of second series of pulses 34 increases. This is because the time which inverted triangular waveform 18 or inverted sinusoidal waveform 32 is greater than control signal 22 increases as control signal 22 decreases.

It will also be appreciated that first series of pulses 28 is staggered with respect to second series of pulses 34. In this example, as shown in FIG. 2, pulse center 38 of first series of pulses 28 is 180 degrees out of phase with pulse center 40 of second series of pulses 34 as compared to the triangular waveform. The same is also true when using the sinusoidal waveform of FIG. 3.

The differences in waveform shape affects control features to some degree. For example, a finer high speed adjustment may be available with a triangular waveform. Other waveforms besides sinusoidal or triangular waveforms might also be generated for use with the present invention if desired for particular applications.

The logic circuitry which is used to combine first series of pulses 28 and second series of pulses 34 includes inverters IC6 and IC7 and NOR gates IC8 and IC9. Pulse outputs from IC8, which may be called forward control pulses, drive the motor in a first direction, which is called a forward direction for discussion herein. Pulse outputs from IC9, which may be called reverse control signals, drive the motor in a second direction opposite to the first direction, which is called a reverse direction for discussion herein. While relatively simple logic circuits may be utilized for implementing the invention, it will be understood that the invention may also be implemented other logic components, utilizing a processor which is programmed to operate in accord with the discussion herein, and the like.

The outputs of both IC4 and IC5 are applied to NOR gate IC9. The inverted outputs of both IC4 and IC5 are applied IC8.

In more detail, first series of pulses 28 produced by comparator IC4 is applied to the input of inverter IC6 and to the input of NOR gate IC8. Second series of pulses 36 produced by comparator IC5 is applied to the input of inverter IC7 and to the input of NOR gate IC8. The output of inverter IC6 is applied to the input of NOR gate IC8. The output of inverter IC7 is applied to NOR gate IC9.

Looking first at NOR gate IC9, and specifically at pulses 42 and 44, it will be appreciated that NOR gate IC9 will produce a logic zero output at the times of pulse 42 and 44. More generally, NOR gate IC9 will produce a logic one output only when all inputs are logic zero. Thus, so long as the combined pulse widths of first series of pulses 28 and second series of pulses 34 is less than the period of the waveform, then there will be times during the period of the waveform when IC9 will be one. For example, between pulse 42 and 44, then reverse control pulse 54 is created. It will be appreciated that pulses such as reverse control pulse 54 are created whenever this gap occurs. Thus, reverse control pulses 56 will be produced by NOR gate IC9 to drive the motor in the reverse direction. A more detailed analysis is directly below in the next paragraph.

Assuming that ENABLE control for IC9 is at logic zero, then the output of IC9 will be one except when at least one of the two series of pulses are one. For example, consider pulses 42 and 44. During pulses 42 and 44, IC9 will produce a logic zero. However, between pulses 42 and 44, when SPWM (A) and SPWM (B) are both zero, IC9 will produce a logic one output, which is reverse control pulse 56. As the pulse widths increase in size, the time for which NOR gate IC8 produces a logic one, decreases. Thus, because IC8 drives the motor in the reverse direction, the speed of rotation in the reverse rotation decreases as the pulse widths 30 and 36 increase. This continues until the combined pulse widths are greater than the cycle time of the waveform.

As the pulse widths continue to increase, rotation in the reverse direction completely ceases as indicated at reverse zero output 68. In this example, this occurs when the control signal is zero as indicated at 23. After the pulse widths reach this width, at least one input to NOR gate IC9 will always be logic one, so that the output is zero. On the other hand, the speed of reverse rotation increases as the pulse widths of first series of pulses 28 and second series of pulses 34 decreases. At some point in the reverse direction, the output of NOR gate IC9 remains a logic one as indicated at 69. Thus, the present invention provides a means to produce a 100% duty cycle for maximum power applied to the motor.

After the above analysis, it will be appreciated so long as the total pulse width of the first and second series is less than the period of the waveform direction of the motor is reverse. Therefore, the inverse of these pulse widths will be greater than the period of the waveform. Thus, during this time NOR gate IC9 will always have at least one input which is one and will therefore always have an output of zero, as indicated at forward zero output 66.

However, when the combined pulse widths of the first and second series of pulses is greater than the period of the waveform, then the combined pulse widths of the inverses of the first and second series of pulses will be less than the period of the waveform. Because the inverses of the first and second series of pulses is applied to NOR gate IC8, as the pulse widths 30 and 36 continue to increase, the motor will eventually rotate in the forward direction and increase with increasing pulse width. For example between the inverse of pulses 58 and 60, then forward pulses, such as forward control pulse 62, are produced by NOR gate IC9. Forward control pulses 64 are thereby created to cause rotation of the motor in the forward direction. If the width 38 and 40 increases, then eventually the output of NOR gate IC8 remains a logic one as indicated at 71. Thus, the present invention provides a 100% duty cycle in both the forward and reverse directions whereby the output remains at one over the entire waveform cycle.

In case the circuit or hardware does not work perfectly, due to power fluctuations or the like, anti-coincidence lines 46 and 48 may be utilized to ensure that when one of the NOR gates is on and producing a logic one, that this logic one is also applied to the other NOR gate to ensure it is turned off.

When control signal 25 is in the center position at zero volts, as indicated at 23 in FIG. 2 and FIG. 3, then the combined pulse widths of the first and second series of pulses is equal to the period of the waveform and so at least one input to both NOR gate IC8 and NOR gate IC9 are always equal to one. Thus, no control pulses are produced, and the the motor is stopped.

To avoid the possibility of minor voltage fluctuations creating any short transient pulses produced at the stop position, various methods may be utilized. In one embodiment, RC circuits 50 and 52 may be added to anti-coincidence lines 46 and 48 so that very narrow control pulses are filtered out. If computer controls are utilized, then at the null point, the computer can apply a logic one signal to the ENABLE inputs of the NOR gates to turn them off. It will also be noted that a switch to the ENABLE inputs of the NOR gates may be utilized to place the system in a sleep mode by setting the ENABLE inputs to a logic 1, which turns off the motor while leaving the control circuits active, if desired. The response time until the system is operational is then somewhat faster as compared to turning the power off and on.

Various devices may be utilized to drive the motor once the forward control pulses 65 and reverse control pulses 56 are produced. My previous patent discloses solid state and mechanical relays. While commercial relays are available, the present invention utilizes a unique N-channel and P-channel FET drive for permanent magnet DC motor 150 where the change in direction is produced by change in current direction. The motor control of the present invention is believed to be more efficient with less potential power loss. Other types of N-channel and P-channel devices, silicon rectifiers, triacs for AC motors, and the like might also be utilized.

In this embodiment, N-channel FET 74 and P-channel FET 76 are utilized to drive the motor in the forward direction. At this time, N-channel FET 78 and P-channel FET 80 are off.

N-channel FET 78 and P-channel FET 80 are utilized to drive the motor in the reverse direction. At this time, N-channel FET 74 and P-channel FET 76 are off.

The motor terminals 86 and 88 are connected to the motor. In the forward direction, positive pulses are applied to the motor. In the reverse direction, the polarities of the pulses are reversed, so that effectively negative pulses are applied to the motor.

Forward control pulses 65 are applied to forward transistor 70 and gate 82 of N-channel FET 74. Reverse control pulses 56 are applied to reverse transistor 72 and gate 84 of N-channel FET 78.

With no pulses produced by either NOR gate IC8 or NOR gate IC9, then all FETS and transistors turned off. In this case, the motor is disconnected from all power sources and ground.

When a forward pulse is produced from NOR gate IC8, the pulse at gate 82 turns on N-Channel FET 74, which connects motor terminal 86 to ground at drain 90 of N-channel FET 74 because source 102 is connected to ground. At the same time, the forward pulse also turns on forward transistor 70, which turns on P-channel FET 76 by connecting gate 92 of P-channel FET 76 to ground. The positive voltage connected to source 94 of P-channel FET 76 is then supplied to drain 96 of P-channel FET 76. This supplies positive voltage to motor terminal 88 with motor terminal 86 at ground. Therefore, the motor turns in the positive direction.

When a reverse pulse is produced from NOR gate IC9, the pulse at gate 84 turns on N-channel FET 78, which connects motor terminal 88 to ground at drain 98 of N-channel FET 78 because source 100 is connected to ground. At the same time, the reverse pulse also turns on reverse transistor 72, which turns on P-channel FET80 by connecting gate 104 of P-channel FET 80 to ground. The positive voltage connected to source 106 of P-channel FET 80 is then supplied to drain 108 of P-channel FET 80. This supplies positive voltage to motor terminal 86 with motor terminal 88 at ground. Therefore, the motor turns in the negative direction.

Although N-channel FET 74 and P-channel FET 80 are never on at the same time, resettable fuse 110 is utilized to protect the FETs from damage in case of an accident. Likewise, fuse resettable fuse 112 protects N-channel FET 78 and P-channel FET 76.

As stated hereinbefore, the motor control circuit of the present invention can be implemented in different ways. Referring now to motor control 10B, shown in FIG. 4, yet another embodiment of the invention is shown. The logic circuitry and motor drive circuitry is identical to that previously discussed in FIG. 1 and is therefore not repeated.

In this embodiment, square wave generator 110 may be utilized to drive one shots 112 and 114 at alternating times of the square wave. In this embodiment, square wave generator 110 produces a square wave at output 116 and an inverse square wave at inverse output 118. Other waveforms such as pulses, sinewave, or the like, might also be utilized to trigger the one-shots.

Figure 5:
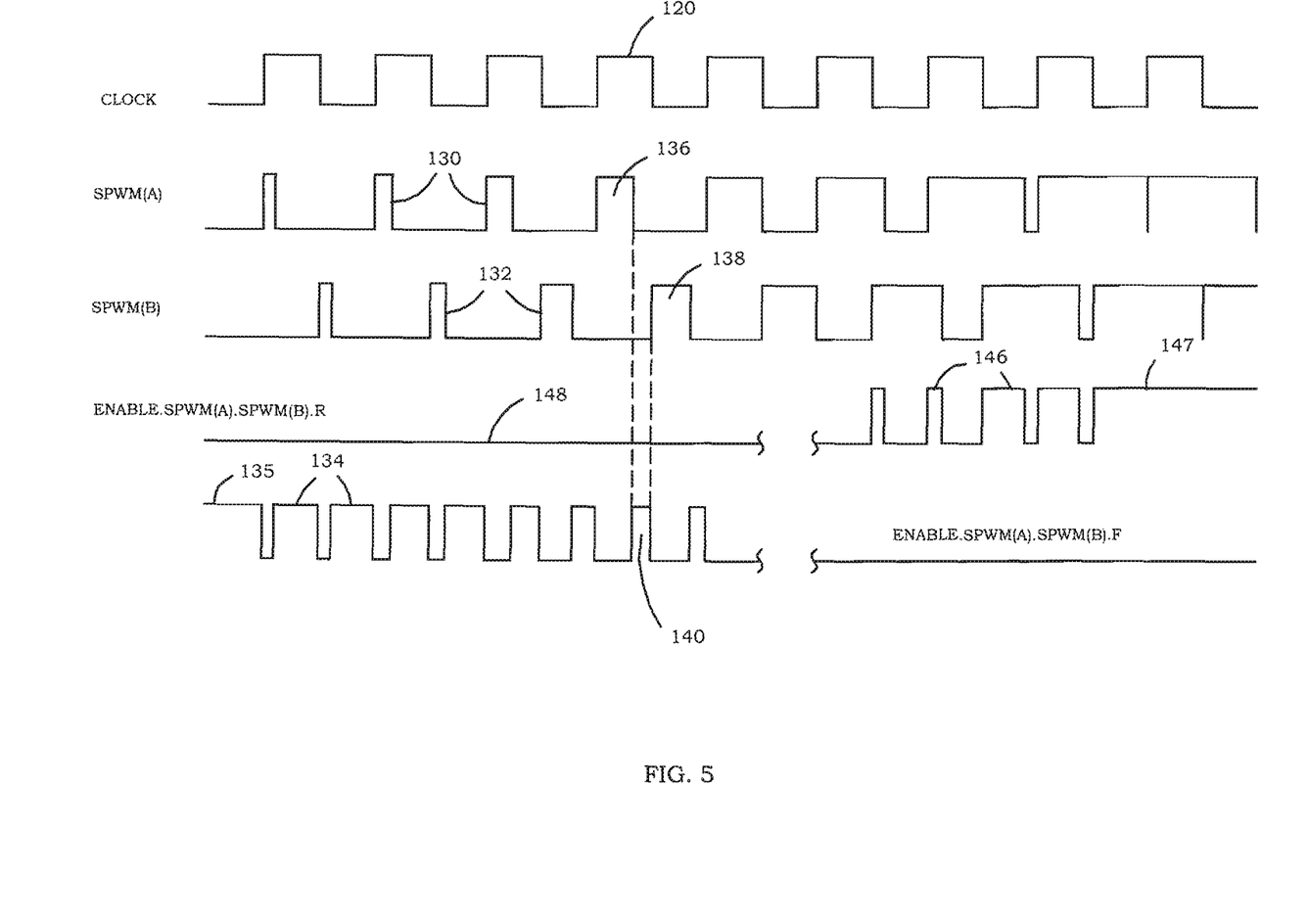
FIG. 5 is a signal diagram of for the motor control of FIG. 4 when used with two variable width pulse generators in accord with one possible embodiment of the present invention.

Square wave 120, shown in FIG. 5 is representative of output 116 and it will be understood an inverse to this square wave, which is not shown in FIG. 5, is also produced. In this embodiment, each one shot is triggered by the rising edge of the waveform once each period of the waveform. Thus, each one-shot is triggered 180 degrees apart with respect to square wave 120.

A variable voltage or the like may be utilized to control the pulse widths of the one-shot pulses and may be connected to both one-shot inputs 122 and 124. For example, a voltage divider or potentiometer, such as voltage divider or potentiometer 25 may be utilized to control the pulse widths produced by the one-shots. However, it will be understood that variations of controls for one-shots are well known and that different devices may be used, some of which are discussed in my previous patent referred to hereinbefore.

By varying the one-shot inputs 122 and 124, the pulse width of the one-shot outputs vary. Thus, at one-shot output 126, variable width pulses 130 as indicated at SPWM (A) are produced and applied to NOR gate IC9. Likewise, at one-shot output 128, variable pulses 132 as indicated at SPWM (B) are produced and applied to NOR gate IC9.

As previously discussed, when all inputs to NOR gate IC9 are zero, then reverse control pulses 134 are produced. For example, between pulse 136 and 138, a reverse control pulse 140 is generated. As discussed before, varying the width of these pulses will vary the reverse rotational speed. The narrower the width of pulses 130 and 132, then faster the reverse rotational speed. In the present invention, the reverse control may remain on constantly as indicated at 135. Refer to the previous discussion for more details.

In this embodiment, the inverse of one-shot outputs 126 and 128 are produced at one-shot inverse outputs 142 and 144. The operation of IC8 to produce forward control pulses 146 was discussed hereinbefore. When the inputs to IC8 are zero, forward control pulses are produced.

As before, when the output of IC8 is zero as indicated at 148, then reverse control pulses 134 may then be produced by IC9. When the output of IC9 is zero as indicated at 150, then IC8 may produce forward control pulses 146. Once the combined pulse width of pulse 130 and 132 is greater than the cycle of square wave 120, only forward control pulses are produce. After this, the wider the width of pulses 130 and 132, then faster the forward rotational speed. In the present invention, the forward control may remain on constantly as indicated at 147.

The operation of IC8 and IC9 and the FETs is the same and reference may be made to the previous discussion in connection with FIG. 2 and FIG. 3 for more details.

Figure 6:
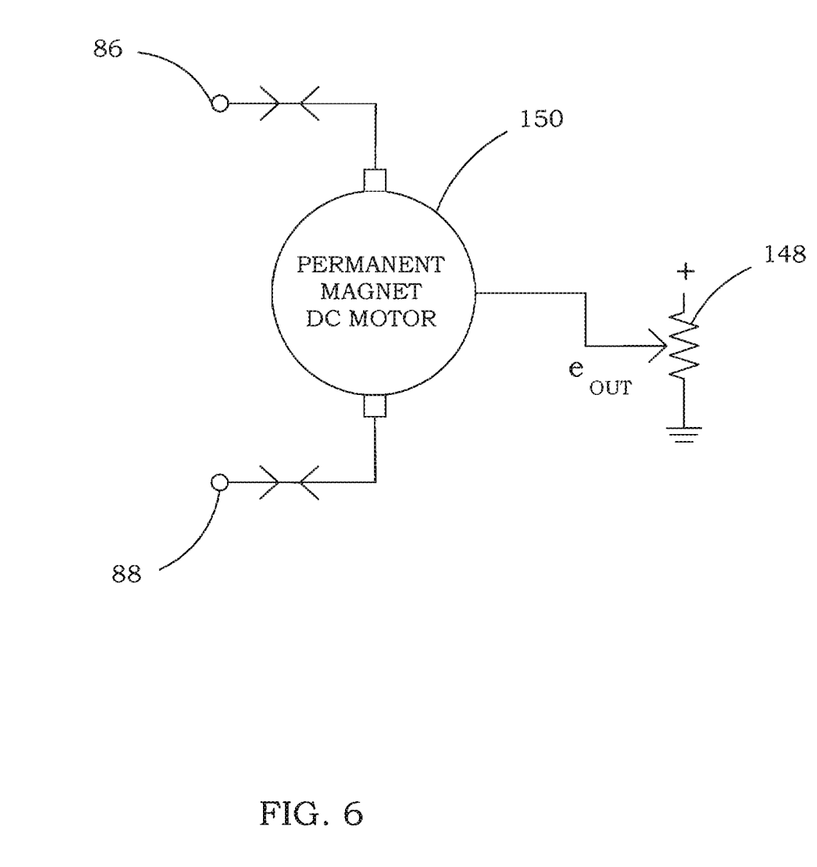
FIG. 6 is a schematic diagram of a DC electric motor with feedback element in accord with one possible embodiment of the present invention.

FIG. 6 shows motor 150 which may have a shaft operably connected to feedback control element 148. Additional details for changing an open loop control system to a closed loop control system are shown in my previous patent.

Figure 7:
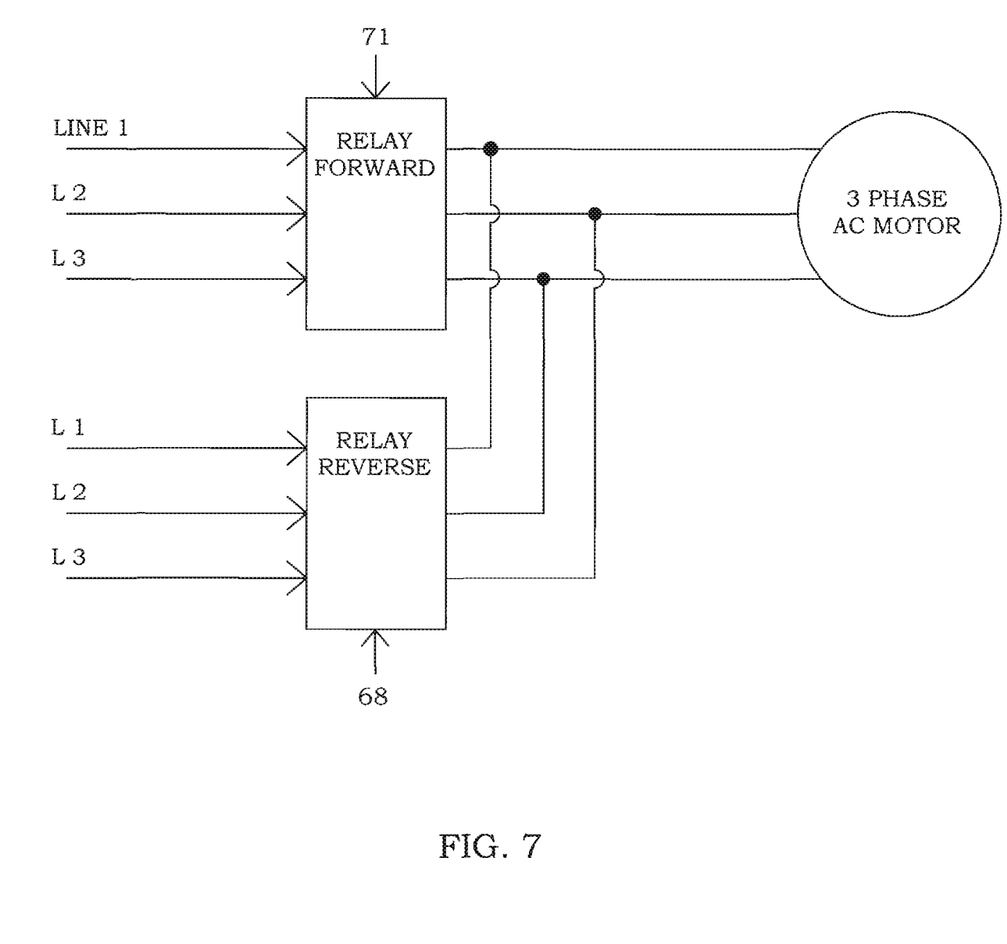
FIG. 7 is a schematic diagram of an AC electric motor drive in accord with one possible embodiment of the present invention.

FIG. 7 shows a three phase motor being operated by pulses produced at 71 and 68 with the relay forward and relay reverse replacing the double pole double throw solid state relay shown in FIG. 1 and FIG. 4. In this example, the relays apply the three phase AC power to the 3 phase AC motor whenever a motor control signal turns on the relays. The motor windings are effective rewired, with any two of the phases reversed, for forward and reverse directions depending on which relay is activated. In this example, the connection of the L2 and L3 phases to the AC motor are changed depending on whether the forward relay or the reverse relay is activated. As discussed previously, the relays may represent solid state or mechanical relays.

A single phase AC power signal could be handled in a similar manner. and motor starter circuits may also be utilized. The pulse generation circuitry for the AC motor control is the same as that for the DC motor control.

A general motor control system in accord with the present invention may be described by the following equations:

For open loop operation:

$$e_{out} = G(s) e_{in}$$

where $e_{in}$ is the input signal applied to the variable pulse duration pulse generators discussed hereinbefore:

$G(s)$ is the transfer function of the control system.

$$G(S) = F(s) \cdot \left[ M\left(\frac{ds^2}{dt}\right) + F\left(\frac{ds}{dt}\right) + K(s) \right],$$

where
F(s) represents the stability of the system, $$M\left(\frac{ds^2}{dt}\right)$$

represents the system inertia, $$F\left(\frac{ds}{dt}\right)$$

represents the system friction, and
K(s) represents the system potential.
For closed loop operation:

$$e_{in} - e_{out} = \text{error}$$

where $e_{out}$ is measured at feedback control element 148.
Then, it can be shown that:

$$e_{out} = [G(s)/(1+G(s))]e_{in}$$

The compensation or stability is utilized to avoid 1+G(s) =0.

The system of the present invention is based on the use of pulse durations for driving the motor backward or forward and the absence of pulse duration to cause the motor to be stationary or nulled. The invention may be applied for servo control of both small and large motors with the same basic design and the use of relays, power transistors, and FETs for driving the motor.

It is also to be understood that the foregoing descriptions of preferred embodiments of the invention have been presented for purposes of illustration and explanation and it is not intended to limit the invention to the precise forms disclosed. It is to be appreciated therefore that various structural and circuit changes, many of which are suggested herein, may be made by those skilled in the art without departing from the spirit of the invention.

What is claimed is
1. A control system operable for controlling a direction and speed of an electric motor, comprising:
at least two variable duration pulse generators which produce output pulses at staggered intervals with respect to each other;
a waveform generator to produce a waveform, said at least two variable pulse generators being operatively connected to said waveform generator;
a variable control for controlling said at least two variable duration pulse generators to thereby vary a duration of said output pulses whereby said output pulses generated by said at least two variable duration pulse generators in response to said variable control comprise variable width pulses;
power switch switches which interfaces with said motor, said power switch network producing power pulses responsive to a combination of said output pulses for application to said motor, said power switches being operable to produce power pulses comprising a power pulse duration which varies with said duration of said output pulses; and
a logic circuit operable for combining said output pulses and producing control signals which control forward and reverse rotational direction and speed of said motor.

2. The control system of claim 1 wherein said logic circuit is operable for controlling said motor continuously from being continuously on in a forward direction to being continuously on in a reverse direction.

3. The control system of claim 2 wherein said waveform generator comprises a sine wave generator, a triangular wave generator, or a square wave generator.

4. The control system of claim 1 further comprising said first of said at least two variable pulse generators being operable to produce a first output pulse responsive to said variable control and a first portion of said waveform, and a second of said at least two variable pulse generators being operable to produce a second output pulse responsive to said variable control and a second portion of said waveform which is out of phase with said first portion of said waveform.

5. The control system of claim 1 wherein said at least two variable pulse generators comprise at least two comparators which compare a voltage level with said waveform.

6. The control system of claim 1 wherein said at least two variable pulse generators comprise at least two one-shot pulse generators.

7. A method for controlling direction and speed of an electric motor, comprising:
producing a repeating waveform at a constant repetition rate with a constant cycle duration;
utilizing a first variable pulse width generator for producing a first group of pulse width modulated pulses which are initiated with respect to a first portion of said repeating waveform;
utilizing a second variable pulse width generator for producing a second group of pulse width modulated pulses which are initiated with respect to a second portion of said repeating waveform;
controlling a duration of said first group of pulse width modulated pulses and said second group of pulse width modulated pulses whereby said first group of pulse width modulated pulses generated by said first variable pulse width generator and said second group of pulse width modulated pulses generated by said second variable pulse generator comprise variable width pulses;
logically combining said first group and said second group of pulse width modulated pulses to produce control signals to control a direction and speed of said electric motor; and
wherein when a combined duration of said first group and said second group of pulse width modulation pulses is greater than said constant cycle duration of said repeating waveform, then driving said electric motor in a first rotational direction, and when a combined duration of said first group and said second group of pulse width modulation pulses is less than said constant cycle duration of said repeating waveform, then driving said electric motor in a second direction opposite to said first direction.

8. The method claim 7 wherein when a combined duration of said first group and said second group of pulse width modulation pulses is equal to said constant cycle duration of said repeating waveform, then said motor does not rotate.

9. The method of claim 7 further comprising comparing a voltage level to said repeating waveform to produce said first group and said second group of pulse width modulated pulses.

10. The method of claim 7 further comprising utilizing at least two one-shot circuits to produce first group and said second group of pulse width modulated pulses.

11. The method of claim 7 further comprising controlling said duration of said first group of pulse width modulated pulses and said second group of pulse width modulated pulses to turn said motor on continuously constant cycle duration.

12. A control system operable for controlling a direction and speed of an electric motor, said electric motor comprising one or more windings, comprising:
   a variable control element;
   at least two variable pulse generators operatively connected to said variable control circuit which generate output pulses with variable width at staggered intervals with respect to each other in response to said variable control element;
   a logic control circuit which receives said output pulses with variable width from said at least two variable pulse generators operable for producing forward control pulses and reverse control pulses which control forward and reverse rotational direction and speed of said electric motor;
   an electric power supply to supply electric power to said electric motor; and
   a first pair of power switches responsive to forward control pulses to apply relatively positive pulses to said electric motor, said first pair of power switches comprising a first n-channel power switch and a first p-channel power switch, a source of said first p-channel power switch being commented to a positive pole of said electric power supply, a source of said first n-channel power switch being connected to a negative pole of said power supply; and
   a second pair of power switches responsive to reverse control pulses to apply relatively negative pulses to said electric motor, said second pair of power switches comprising a second n-channel power switch and a second p-channel power switch, a source of said second p-channel power switch being commented to a positive pole of said electric power supply, a source of said second n-channel power switch being connected to a negative pole of said power supply.

13. The control system of claim 12 wherein said logic control circuit is operable for controlling a rotational speed of said electric motor in said forward direction or said reverse direction by controlling a time duration in which said first pair of power switches or said second pair of power switches are turned on.

14. The control system of claim 12 further comprising a waveform generator operable to produce a waveform, said at least two variable pulse generators comprise at least two comparators which compare a voltage level with said waveform.

15. The control system of claim 12 wherein said at least two variable pulse generators comprise at least two one-shot pulse generators.

16. The control system of claim 12 wherein said logic circuit is operable for combining pulse widths of said respective output pulses of said at least two variable pulse generators.

17. The control system of claim 12, wherein said logic circuit is operable for controlling said motor continuously from being continuously on in a forward direction to being continuously on in a reverse direction.

* * * * *

UNITED STATES PATENT AND TRADEMARK OFFICE
CERTIFICATE OF CORRECTION

PATENT NO. : 8,427,084 B2
APPLICATION NO. : 12/506478
DATED : April 23, 2013
INVENTOR(S) : Herbert S. Kobayashi It is certified that error appears in the above-identified patent and that said Letters Patent is hereby corrected as shown below:

In the Claims

Column 15, line 61, claim 1, delete "power switch switches" and replace with "power switches".

Column 15, line 62, claim 1, delete "power switch network" and replace with "power switches".

Column 17, line 13, claim 12, delete "circuit" and replace with "element".

Column 17, line 24, claim 12, delete "and".

Signed and Sealed this
Fifth Day of November, 2013

Teresa Stanek Rea
*Deputy Director of the United States Patent and Trademark Office*